(12) United States Patent
Stoops (10) Patent No.: US 9,016,965 B1
(45) Date of Patent: Apr. 28, 2015

(54) KEYBOARD/KEYBOARD ENCLOSURE

(76) Inventor: Kevin R. Stoops, Bucyrus, KS (US)

( * ) Notice: Subject to any disclaimer, the term of this patent is extended or adjusted under 35 U.S.C. 154(b) by 67 days.

(21) Appl. No.: 12/849,009

(22) Filed: Aug. 2, 2010

Related U.S. Application Data (60) Provisional application No. 61/230,499, filed on Jul. 31, 2009.

(51) Int. Cl.
*B41J 5/00* (2006.01)
*G06F 3/02* (2006.01)
*H01H 9/02* (2006.01)

(52) U.S. Cl.
CPC ............ *G06F 3/0202* (2013.01); *H01H 9/0214* (2013.01)

(58) Field of Classification Search
CPC ..... H01H 9/00; H01H 9/0214; H01H 9/0242; H01H 9/04; H01H 2009/0292; G06F 3/0202
USPC .......................... 400/472; 361/679.08, 679.09
See application file for complete search history.

(56) References Cited

U.S. PATENT DOCUMENTS

| | | | | | |
|---|---|---|---|---|---|
| 3,613,044 | A | * | 10/1971 | Rarick | 439/528 |
| 3,773,969 | A | * | 11/1973 | Geisel | 174/67 |
| 3,792,414 | A | * | 2/1974 | Smith | 439/144 |
| 5,110,228 | A | * | 5/1992 | Yokomizo | 400/208 |
| 5,237,487 | A | * | 8/1993 | Dittmer et al. | 361/679.09 |
| 5,403,207 | A | * | 4/1995 | Briones | 439/620.17 |
| 6,259,044 | B1 | * | 7/2001 | Paratore et al. | 200/5 A |
| 6,365,848 | B1 | * | 4/2002 | Maple | 200/5 A |
| 6,685,369 | B2 | * | 2/2004 | Lien | 400/472 |
| 6,686,908 | B1 | * | 2/2004 | Kobayashi | 345/173 |
| 6,705,787 | B2 | * | 3/2004 | Jeffries et al. | 400/714 |
| 6,765,158 | B1 | * | 7/2004 | Morrison et al. | 200/5 R |
| 8,046,032 | B2 | * | 10/2011 | Babella | 455/575.1 |
| 2003/0044000 | A1 | * | 3/2003 | Kfoury et al. | 379/433.04 |
| 2003/0078014 | A1 | * | 4/2003 | Salminen et al. | 455/90 |
| 2003/0108374 | A1 | * | 6/2003 | Lien | 400/472 |
| 2004/0013456 | A1 | * | 1/2004 | Hochgesang et al. | 400/489 |
| 2005/0083307 | A1 | * | 4/2005 | Aufderheide et al. | 345/173 |
| 2006/0159506 | A1 | * | 7/2006 | Cheng et al. | 400/472 |
| 2007/0099675 | A1 | * | 5/2007 | Silverbrook | 455/572 |
| 2007/0235309 | A1 | * | 10/2007 | Tsu | 200/515 |
| 2007/0290889 | A1 | * | 12/2007 | Wiley | 341/22 |
| 2008/0085142 | A1 | * | 4/2008 | Caveney et al. | 400/472 |
| 2008/0297994 | A1 | * | 12/2008 | Shi | 361/680 |
| 2008/0309633 | A1 | * | 12/2008 | Hotelling et al. | 345/173 |
| 2009/0167287 | A1 | * | 7/2009 | Van Meijl et al. | 324/66 |
| 2010/0253552 | A1 | * | 10/2010 | Lanceros Mendez et al. | 341/22 |
| 2011/0017524 | A1 | * | 1/2011 | Chen et al. | 178/18.06 |
| 2011/0095918 | A1 | * | 4/2011 | Kim et al. | 341/22 |

\* cited by examiner

*Primary Examiner* — David Banh
(74) *Attorney, Agent, or Firm* — Kutak Rock LLP; Bryan P. Stanley (57) ABSTRACT

A keyboard/keyboard enclosure is provided. The keyboard/keyboard enclosure includes front and rear shells removably connected together and made of a polymer material such as Nylon 6. A keypad is positioned on the front surface of the front shell. The rear shell includes a cutout and a removable hatch covering the cutout.

20 Claims, 8 Drawing Sheets

KEYBOARD/KEYBOARD ENCLOSURE

CROSS-REFERENCE TO RELATED APPLICATIONS

This application claims priority pursuant to 35 U.S.C. 119(e) to U.S. Provisional Patent Application Ser. No. 61/230,499, filed Jul. 31, 2009, the entire disclosure of which is incorporated herein by reference.

FIELD OF THE INVENTION

The present invention relates generally to computer user interfaces. More specifically, the present invention relates to a keyboard/keyboard enclosure particularly well-suited for use in quick serve restaurant environments.

BACKGROUND OF THE INVENTION

Quick serve restaurants utilize many computers for purposes such as inputting orders at the counter, for completing food orders in the kitchens. Many of the computers include a PS/2 style input interface. The input interface (keyboard) typically includes a small number of keys (compared to a QWERTY keyboard) that includes letters, numbers, symbols or words associated with certain functions of the computer (i.e. inputting a customer's order, inputting completion of the order by a kitchen staff person, etc.). As commercial kitchen environments are typically extremely harsh due to high temperatures, corrosive substances (foods, liquids, etc.), employee usage/abuse, etc., the computer input interface devices are subjected to significant wear and tear.

The input interface devices of the prior art typically includes a two-piece metal enclosure shell (front shell half and rear shell half) for a printed circuit board (PCB). The printed circuit board includes connectors for a PS/2 cable that connects to a computer, and for a ribbon cable that connects to a keypad membrane that is mounted to the outer surface of the enclosure. The PS/2 cable extends out a slot in the enclosure and is connected to the computer. To install (or reinstall/replace) the PS/2 cable it is required to disassemble the two halves of the enclosure shell and insert the cable into the slot in the side of one of the halves of the shell. This is a time consuming process, and can result in damage to the PCB. In addition, the metal case of the prior art enclosure is heavy and subject to corrosion due to the harsh kitchen environments. Further, the keypad/switch membrane of the prior art includes metal dome buttons that tend to break apart after a number of presses. The buttons of a single row are connected together serially, such that if one button fails, the entire row stops working.

Therefore, it is desirable to provide a keyboard/keyboard enclosure that is lightweight and/or which can withstand harsh environments such as in a kitchen.

SUMMARY OF THE INVENTION

The instant invention provides a keyboard/keyboard enclosure that overcomes the disadvantages of the prior art described above. The keyboard enclosure of the instant invention is preferably made of a lightweight, injection molded material, such as nylon 6. The enclosure of the preferred embodiment includes a front shell portion and a rear shell portion, each made of nylon 6.

The front shell of the preferred embodiment includes a pass-through slot for the ribbon cable of a keypad membrane, and holes to allow sound to pass from a speaker mounted to the PCB or otherwise located at the interior of the enclosure. The front surface of the front shell includes a molded inset in which the keypad fits and lies flush. The rear side of the front shell includes four posts onto which the PCB is mounted. The posts are positioned with a slight offset from mounting holes located in the PCB. As the PCB is placed over the ends of the posts, the posts flex inward slightly to engage with the holes in the PCB. The tension created by the flexed posts securely hold (or snap) the PCB in position. The top ends of two of the posts include a rounded extension portion that extends through the holes in the PCB and into engagement slots located in the rear shell portion. The other two posts include inner voids into which screws are driven and retained to connect the front and rear portions of the enclosure together. The inside of the front shell further includes four slots formed in the shell or locating square nuts that can be used to mount the enclosure to a mounting bracket. Knockouts (sections of minimal material thickness) are located through the shell into the slots to allow a screw to extend from the exterior of the shell and engage the square nuts within the slots.

The rear shell portion of the preferred embodiment includes a cutout section over which a removable hatch cover is located. The cutout section is surrounded by walls that extend generally perpendicular to the interior surface of the rear shell. The walls extend generally to the interior surface of the front shell portion. The walls include a slot through which the PS/2 cable is inserted. The slot is associated with the PS/2 connection on the PCB. In operation, the hatch cover is removed from the rear shell portion, the PS/2 cable is inserted and plugged into the PCB and, in one embodiment, a loop of cable is left within the enclosure before the hatch cover is replaced. The loop allows some slack in the cable to prevent the cable from being inadvertently disconnected. In another embodiment, a flange member protrudes generally perpendicular from one or more of the walls that surround the cutout. The flange member includes a hole through which a zip-tie or other securing member may be located to secure the PS/2 cable to the flange member and thus prevent the cable from being inadvertently disconnected. The interior of the rear shell includes a number of fingers protruding generally perpendicular to the interior surface of the rear shell. The fingers are located about a circumferential lip of the rear shell that mates with a circumferential lip of the front shell. The fingers fit snug against the lip of the front shell to hold the two shells together in a rigid manner.

The keypad membrane of the instant invention includes an extra-long ribbon cable extending from the keypad membrane. The ribbon cable extends through the slot in the front shell portion of the enclosure and is folded in an "S" shape within the enclosure and is connected to the PCB. This allows the ribbon cable to be easily connected to the PCB. The keypad membrane of the instant invention includes embossed buttons for each key, instead of metal domes. In addition, the buttons are connected together in parallel and each button includes at least two front side leads. In the preferred embodiment, only a single back side lead is connected to each button; however it will be appreciated that a plurality of leads may also be connected to the back side without departing from the spirit and scope of the instant invention. In one embodiment, each front side lead for each button includes connection sections of varying dimensions to create different resistances during flexing caused by pressing of the buttons. This results in decreased wear on the connections.

The keypad membrane is covered by a cover membrane that includes clear window sections. The cover membrane includes an open slot to allow a keypad card to be inserted (and removed) between the rear of the cover membrane and the front of the keypad membrane. The keypad card includes numbers, symbols, words, etc. that associate with the function that is to be performed by the pressing of a key. In one embodiment, a keypad cover fits over the keyboard enclosure once the entire enclosure, keypad member and cover membrane are assembled. The keypad cover is made of a polymer material that includes enough flexibility to allow the keypad cover to snap around the assembled keyboard enclosure.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1 through 8 a keyboard/keyboard enclosure 10 of an embodiment of the instant invention is shown. The keyboard enclosure of the instant invention includes front shell portion 12 and rear shell portion 14, each of which is preferably made of a lightweight, injection molded material, such as nylon 6.

Figure 4:
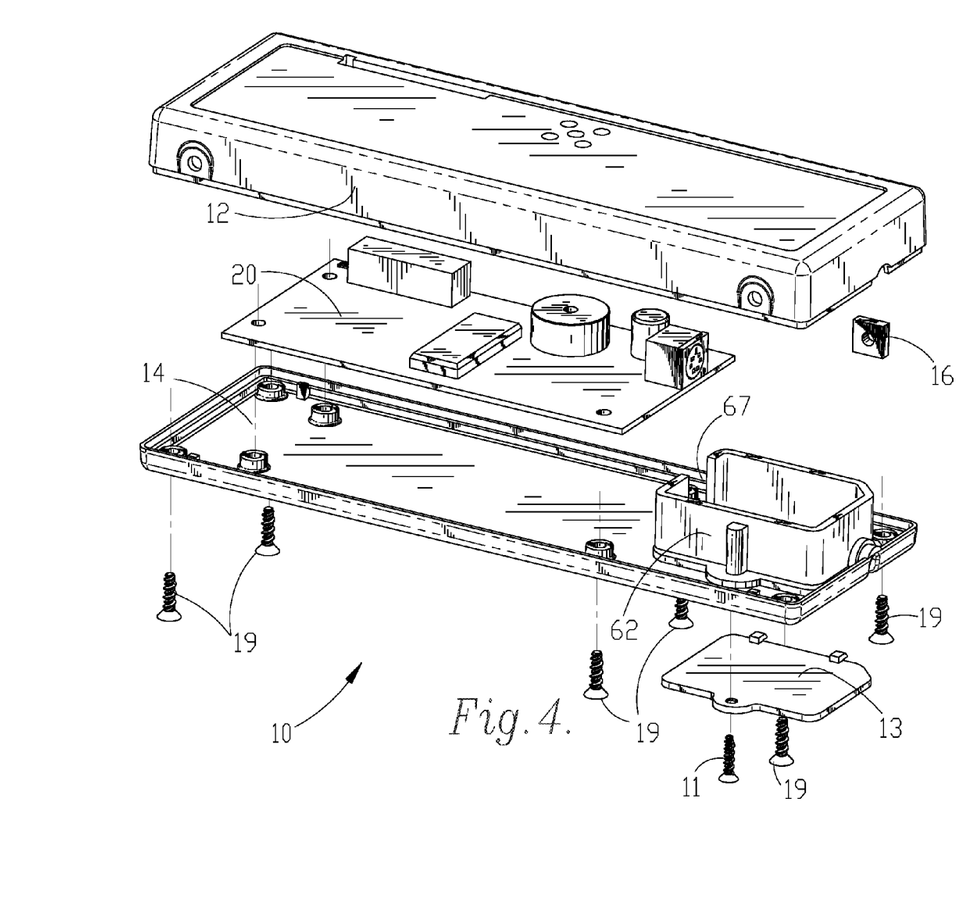
FIG. 4 is an exploded top front perspective view of the assembly of the keyboard/keyboard enclosure of FIG. 1 with a PCB.
Figure 5:
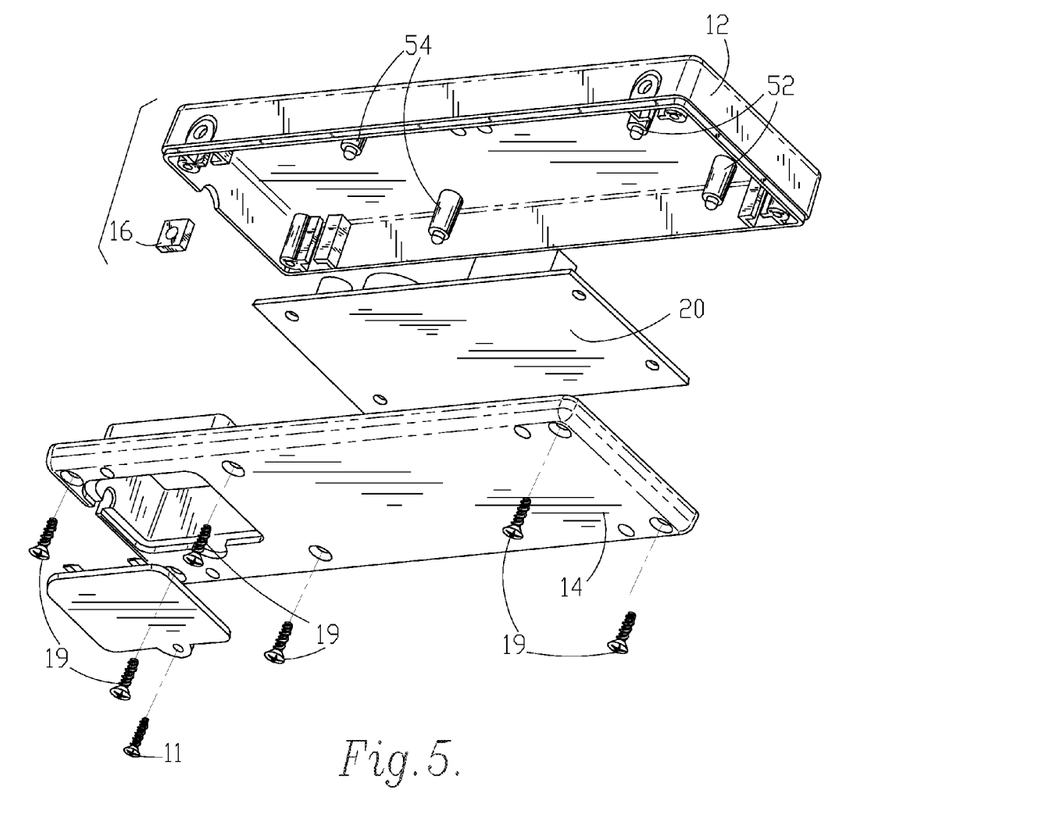
FIG. 5 is an exploded bottom front view of the assembly of the keyboard/keyboard enclosure of FIG. 1 with a PCB.

The front shell 12 of the preferred embodiment includes a pass-through slot 15 for the ribbon cable of a keypad membrane to extend, and holes 17 to allow sound to pass from a speaker mounted to PCB 20 or otherwise located at the interior of the enclosure. The front surface of the front shell includes a molded inset 18 in which keypad 30 fits and lies flush. The rear side of the front shell includes four posts (52 and 54) onto which the PCB is mounted. The posts are positioned with a slight offset from mounting holes located in the PCB. As the PCB is placed over the ends of the posts, the posts flex inward slightly to engage with the holes in the PCB. The tension created by the flexed posts securely hold (or snap) the PCB in position. The top ends of two of the posts (52) include a rounded extension portion that extends through the holes in the PCB and into engagement slots located in the rear shell portion. The other two posts (54) include inner voids into which screws 19 are driven and retained to connect the front and rear portions of the enclosure together. The inside of the front shell further includes four slots formed in the shell for locating square nuts 16 that can be used to mount the enclosure to a mounting bracket. Knockouts (sections of minimal material thickness) are located through the shell into the slots to allow a screw to extend from the exterior of the shell and engage the square nuts within the slots.

Figure 1:
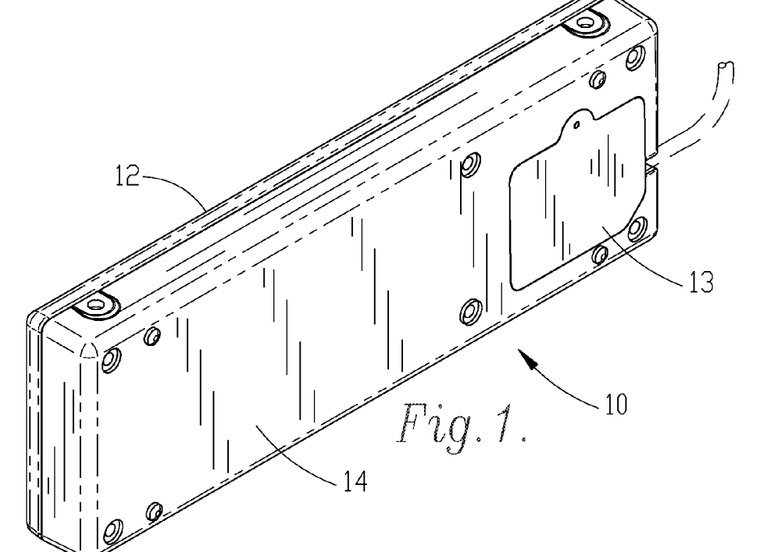
FIG. 1 is a rear perspective view of a keyboard/keyboard enclosure of an embodiment of the instant invention.
Figure 2:
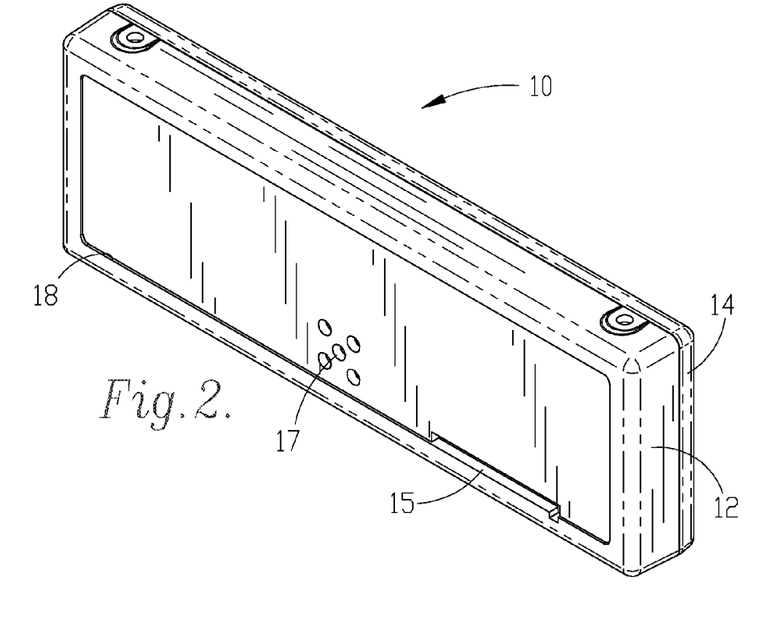
FIG. 2 is a front perspective view of the keyboard/keyboard enclosure of FIG. 1.
Figure 3:
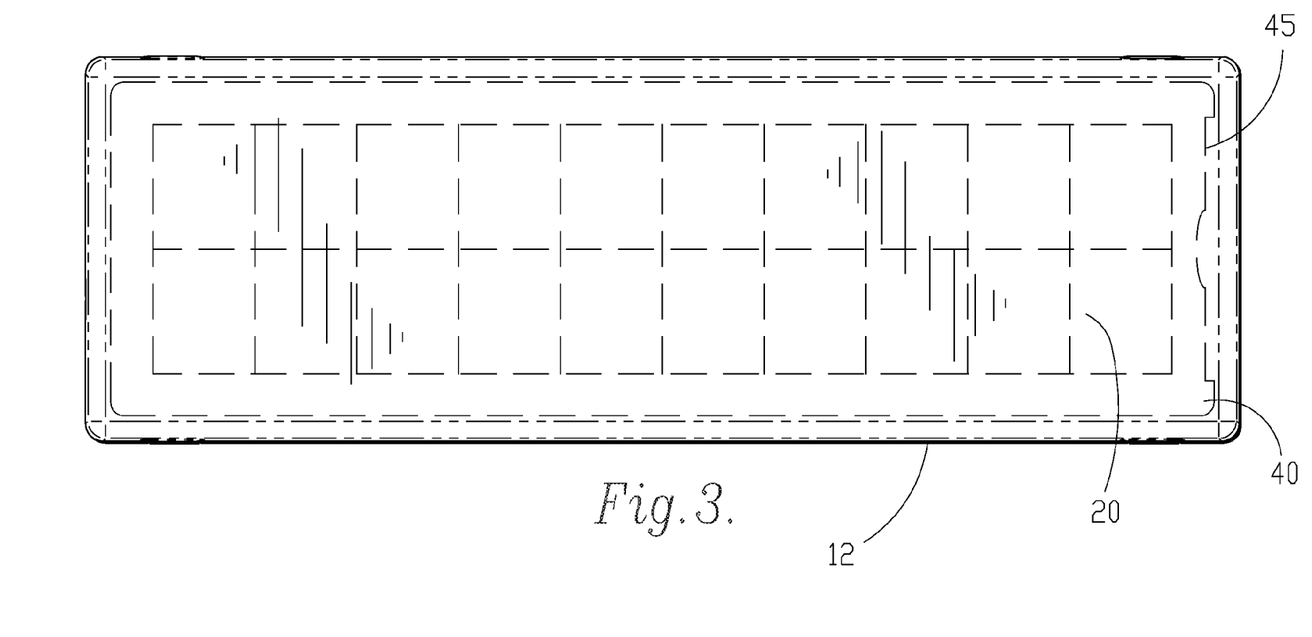
FIG. 3 is a front view of the keyboard/keyboard enclosure of FIG. 1 with a keypad overlay positioned on the front surface of the keyboard/keyboard enclosure.
Figure 6:
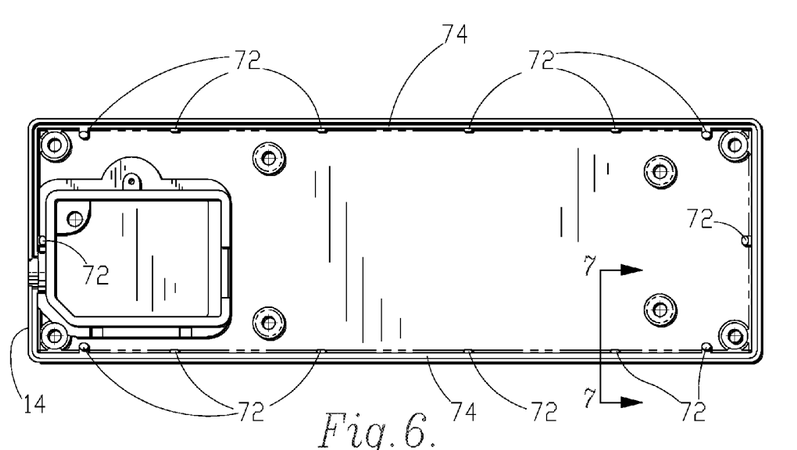
FIG. 6 is a plan view of the rear surface of the rear shell of the keyboard/keyboard enclosure of FIG. 1 including fingers for snuggly engaging a mating lip of a front shell portion of the enclosure.

The rear shell portion of the preferred embodiment includes a cutout section over which a removable hatch cover 13 is located. The hatch cover 13 is attached to the rear shall portion via screw 11. The cutout section is surrounded by walls 62 that extend generally perpendicular to the interior surface of the rear shell. The walls extend generally to the interior surface of the front shell portion. The walls include a slot 64 through which the PS/2 cable is inserted. The slot is associated with the PS/2 connection on the PCB.

Figure 8:
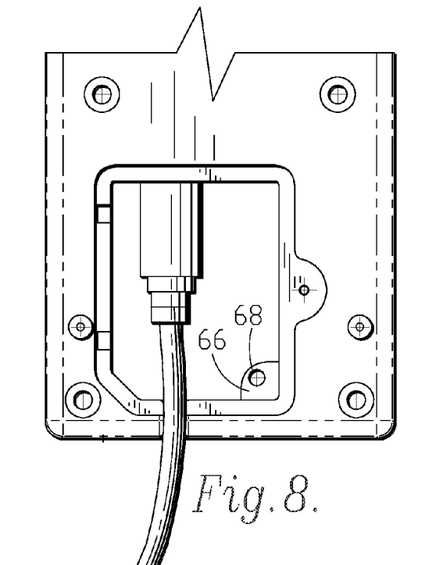
FIG. 8 is a partial bottom plan view of the cutout section of the rear shell portion of the keyboard/keyboard enclosure of FIG. 1. including a flange member for securing a PS/2 cable.

In operation, the hatch cover 13 is removed from the rear shell portion, the PS/2 cable is inserted and plugged into the PCB and, in one embodiment, a loop of cable is left within the enclosure before the hatch cover is replaced. The loop allows some slack in the cable to prevent the cable from being inadvertently disconnected. In another embodiment, as is shown in FIG. 8, a flange member 66 protrudes generally perpendicular from one or more of the walls that surround the cutout. In the embodiment shown in FIG. 8, the flange member 66 protrudes from two walls. The flange member includes a hole 68 through which a zip-tie or other securing member may be located to secure the PS/2 cable to the flange member and thus prevent the cable from being inadvertently disconnected.

Figure 7:
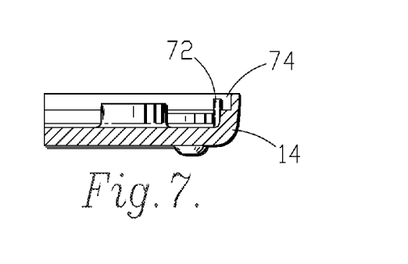
FIG. 7 is a detailed partial cross section of the rear shell of FIG. 6, showing the fingers in detail.

Referring to FIGS. 6 and 7, the interior of the rear shell 14 includes a number of fingers 72 protruding generally perpendicular to the interior surface of the rear shell 14. The fingers are located about a circumferential lip 74 of the rear shell that mates with a circumferential lip of the front shell 12. The fingers fit snug against the lip of the front shell to hold the two shells together in a rigid manner.

Figure 9:
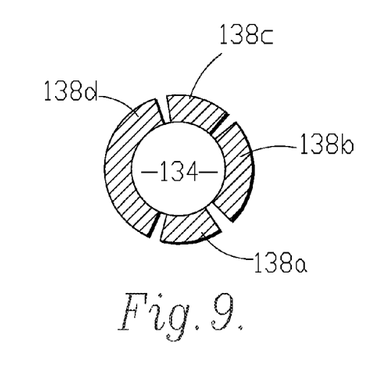
FIG. 9 is a front view of a button for a keypad membrane of one preferred embodiment of the instant invention in which multiple leads of different dimensions are utilized on the front side of each button.
Figure 10:
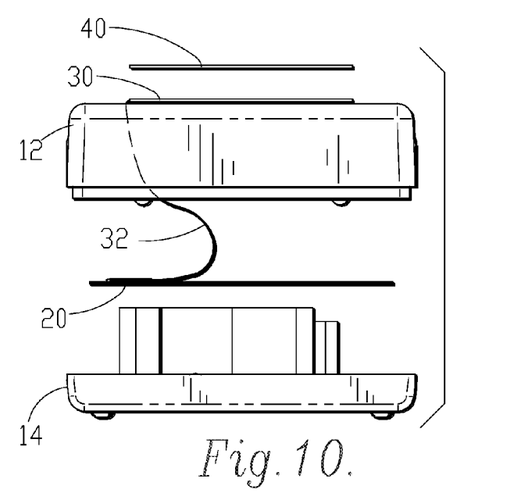
FIG. 10 is an exploded side view of the assembly of a keyboard/keyboard enclosure of an embodiment of the instant invention.
Figures 11, 12:
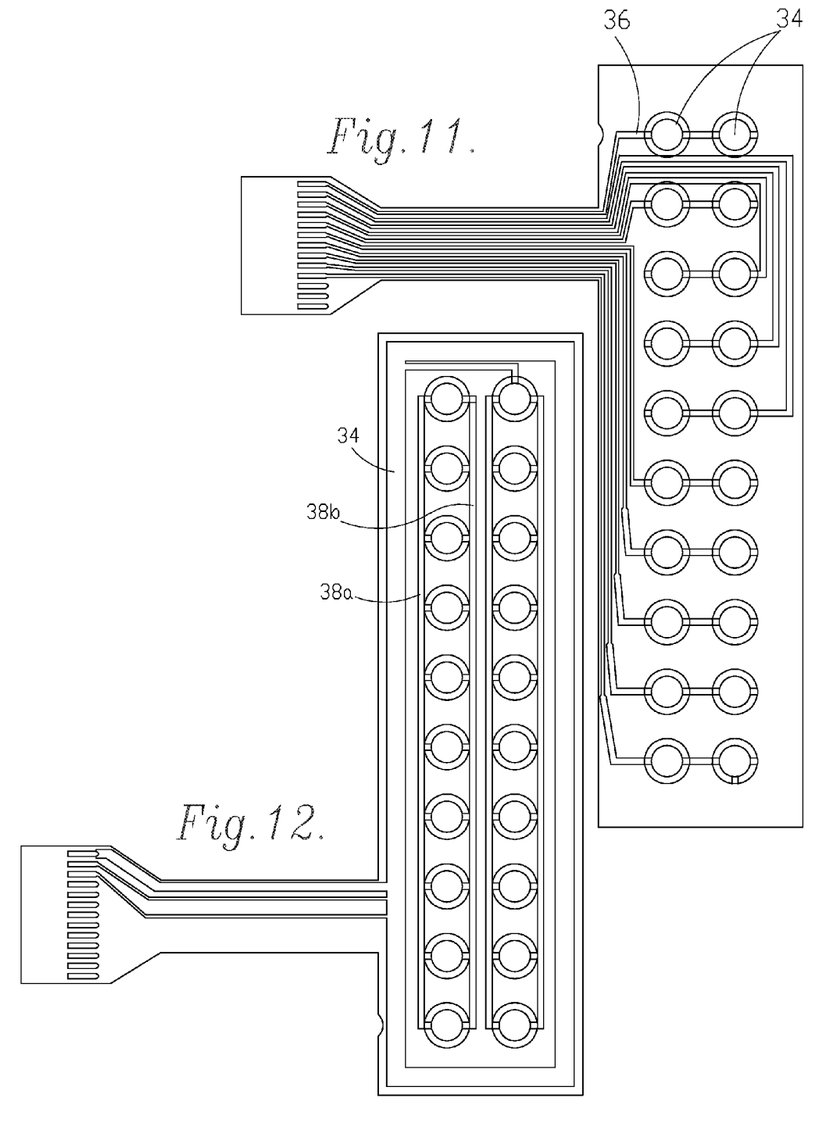
FIGS. 11 and 12 are rear and front, respectively, plan views of a keypad membrane of an embodiment of the instant invention in which two parallel front leads are connected to each button/switch.

Referring to FIG. 10, in one embodiment of the instant invention the keypad membrane 30 of the instant invention includes an extra-long ribbon cable 32 extending from the keypad membrane 30. The ribbon cable 32 extends through the slot in the front shell portion of the enclosure and is folded in an "S" shape within the enclosure and is connected to the PCB 20. This allows the ribbon cable to be easily connected to the PCB. The keypad membrane 30 of preferred embodiments of the instant invention includes embossed buttons for each key, instead of metal domes. In addition, in preferred embodiments the buttons are connected together in parallel and each button includes at least two front side leads. FIGS. 11 and 12 show an embodiment of the instant invention that includes two front side leads 38a and 38b to each button 34. In the embodiment shown in FIGS. 11 and 12, only a single back side lead 36 is connected to each button 34 (see FIG. 11); however it will be appreciated that a plurality of leads may also be connected to the back side without departing from the spirit and scope of the instant invention. Referring to FIG. 9 another embodiment of the instant invention is shown in which four front side leads 138a, 138b, 138c and 138d are connected to each button 134. In the embodiment shown in FIG. 9, each front side lead for each button includes connection sections of four varying dimensions to create four different resistances during flexing caused by pressing of the buttons. This results in decreased wear on the connections.

Figure 13:
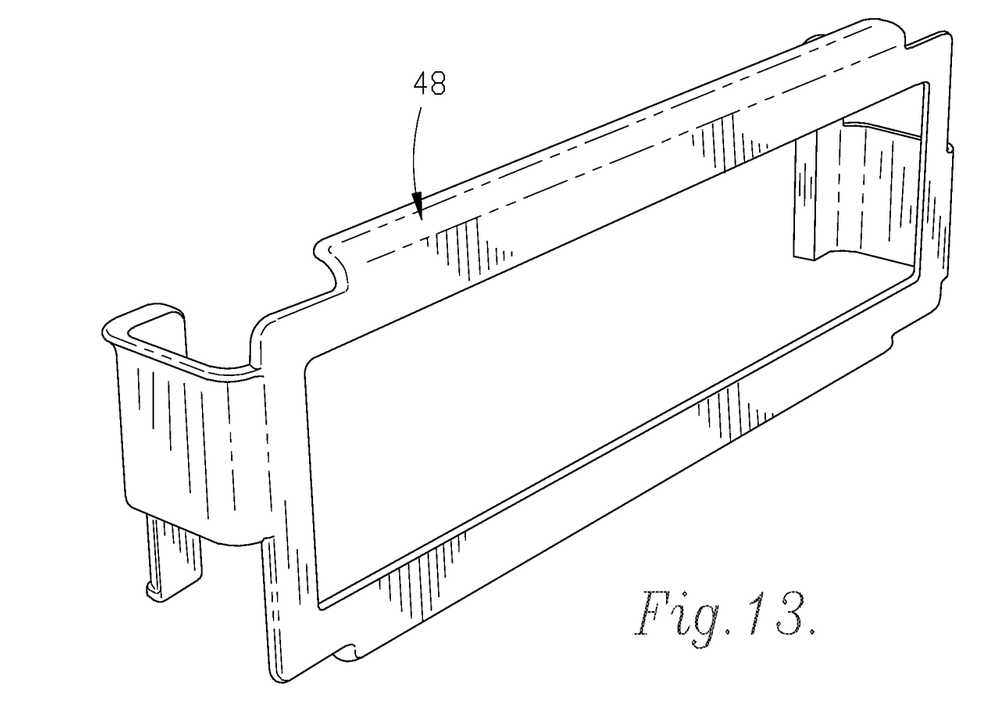
FIG. 13 is a front perspective view of a keypad cover for the keyboard/keyboard enclosure of FIG. 1.

In a preferred embodiment, the keypad membrane 30 is covered by a cover membrane 40 that includes clear window sections. The edges of the cover membrane are secured to the front surface of front shell 12 and includes an open slot 45 to allow a keypad card to be inserted (and removed) between the rear of the cover membrane and the front of the keypad membrane. The keypad card includes numbers, symbols, words, etc. that associate with the function that is to be performed by the pressing of a key. In one embodiment, a keypad cover 48 (shown in FIG. 13) fits over the keyboard enclosure once the entire enclosure, keypad member and cover membrane are assembled. The keypad cover is made of a polymer material that includes enough flexibility to allow the keypad cover to snap around the assembled keyboard enclosure. The keypad cover helps to protect the keypad and keyboard/keyboard enclosure and also allows the keyboard enclosure to fit within a variety of different mounting brackets that are used in the restaurant industry.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A keyboard comprising:
   a front shell portion made of a polymer material;
   a rear shell portion made of a polymer material and removably connected to said front shell portion forming a cavity that is generally enclosed by said from and rear shell portions;
   a keypad positioned over a generally flat and substantially solid front surface of said front shell;
   a cover membrane positioned over said keypad, with said cover membrane having edges secured to said front shell and having an open slot for allowing access between said front shell and said cover membrane,
   a keypad card moveable between a first position between said keypad and said cover membrane and a second position displaced from said keypad and said cover membrane;
   wherein said open slot is configured to allow access to said keypad card to pass between said front shell and said cover membrane so as to enable said keypad card to move between the first and second positions;
   wherein said front shell portion and said cover membrane are configured to prevent said keypad from passing through said slot; and
   wherein said keypad is completely operational with or without said keypad card inserted in said first position, such that moving said keypad card from said first position to said second position and/or from said second position to said first position has no impact on the functions of said keypad.

2. The keyboard as claimed in claim 1 wherein said polymer material is nylon 6.

3. The keyboard as claimed in claim 1 further comprising a cutout in said rear shell portion and a hatch cover removably positioned over said cutout.

4. The keyboard as claimed in claim 1 wherein said front shell portion includes an inset in said front surface in which said keypad is positioned.

5. The keyboard as claimed in claim 1 wherein said front shell portion includes a plurality of posts extending from said front shell portion for mounting a PCB to said front shell portion.

6. The keyboard as claimed in claim 5 wherein said posts are positioned with a slight offset from mount holes of said PCB, wherein said posts flex slightly to engage with said holes of said PCB, and wherein tension created between said plurality of posts hold said PCB in position.

7. The keyboard as claimed in claim 1 wherein said rear shell portion includes a plurality of fingers protruding generally perpendicular to an interior surface of said rear shell about a circumferential lip of said rear shell, and wherein said fingers and lip of said rear shell mate with a circumferential lip of said front shell to snugly engage said lip of said front shell between said fingers and lip of said rear shell.

8. The keyboard as claimed in claim 1 wherein said keypad includes embossed buttons included as part of a unitary keypad membrane.

9. The keyboard as claimed in claim 1 wherein said keypad includes buttons that each include at least two front side leads located at generally opposing sides of each button.

10. The keyboard as claimed in claim 9 wherein each front side lead includes a connection section of varying dimensions.

11. The keyboard as claimed in claim 1 where said cover membrane extends over the entire top surface inset of said front shell keypad.

12. The keyboard as claimed in claim 1 further comprising a keypad cover having flexible side members that snap fit around said front shell portion and said rear shell portion, with said side members operable to secure the keypad cover in place.

13. The keyboard as claimed in claim 1 further comprising:
a slot extending through a portion of said front surface of said front shell;
a circuit board positioned within said cavity; and
a cable extending from said circuit board to said keypad through said slot.

14. The keyboard as claimed in claim 13 further comprising holes extending through a portion of said front surface of said front shell, said holes associating with a speaker mounted on said circuit board.

15. The keyboard as claimed in claim 14 further comprising an inset in said front surface, wherein said slot and said holes a located within said inset, and wherein said keypad is positioned within said inset.

16. The keyboard as claimed in claim 13 wherein said front shell portion includes a plurality of posts extending from said front shell portion for mounting said circuit board to said front shell portion.

17. The keyboard as claimed in claim 16 wherein said posts are positioned with a slight offset from mount holes in said circuit board.

18. The keyboard as claimed in claim 13 further comprising a cutout in said rear shell portion and a hatch cover removably positioned over said cutout.

19. The keyboard as claimed in claim 18 wherein said cutout includes an opening through said rear shell portion for positioning a cable connected to said circuit board, and wherein said opening is partially enclosed by said hatch cover.

20. The keyboard as claimed in claim 1 wherein said keyboard card does not include an electrical connector.

* * * * *

UNITED STATES PATENT AND TRADEMARK OFFICE
CERTIFICATE OF CORRECTION

| | | |
|---|---|---|
| PATENT NO. | : 9,016,965 B1 | Page 1 of 1 |
| APPLICATION NO. | : 12/849009 | |
| DATED | : April 28, 2015 | |
| INVENTOR(S) | : Kevin R. Stoops | |

It is certified that error appears in the above-identified patent and that said Letters Patent is hereby corrected as shown below:

In the claims,

In Column 6, Line 23, the patent now reads "cavity that is generally enclosed by said from and rear"; this should read-cavity that is generally enclosed by said front and rear
The patent now includes the word "from" this should be replaced with the word "front"

In Column 8, Line 7, the patent now reads "holes a located within said inset, and wherein said keypad is"; this should read-holes are located within said inset, and wherein said keypad is
The patent now includes the word "a"; this should be replaced with the word "are."

Signed and Sealed this
Twenty-fifth Day of August, 2015

Michelle K. Lee
*Director of the United States Patent and Trademark Office*